(12) United States Patent
Marzluf

(10) Patent No.: US 6,719,898 B1
(45) Date of Patent: Apr. 13, 2004

(54) SIEVING DEVICE

(75) Inventor: Werner Marzluf, Rheinstetten (DE)

(73) Assignee: Geiger International GmbH & Co. Technology KG, Karlsruhe (DE)

( * ) Notice: Subject to any disclaimer, the term of this patent is extended or adjusted under 35 U.S.C. 154(b) by 72 days.

(21) Appl. No.: 10/048,152

(22) PCT Filed: Jul. 1, 2000

(86) PCT No.: PCT/DE00/02210
§ 371 (c)(1),
(2), (4) Date: Jan. 24, 2002

(87) PCT Pub. No.: WO01/08780
PCT Pub. Date: Feb. 8, 2001

(30) Foreign Application Priority Data

Jul. 28, 1999 (DE) .......................... 199 35 321

(51) Int. Cl.[7] .............................. B01D 33/15
(52) U.S. Cl. .................. 210/158; 210/160; 210/161; 210/328; 210/391; 210/400
(58) Field of Search ................ 210/155, 158, 210/160, 161, 400, 401, 328, 391, 333.01

(56) References Cited

U.S. PATENT DOCUMENTS

| | | | |
|---|---|---|---|
| 1,864,359 A | | 6/1932 | Laughlin et al. |
| 2,013,971 A | * | 9/1935 | Kaisch ....................... 210/158 |
| 2,095,504 A | * | 10/1937 | Kesti et al. .................. 210/160 |
| 4,892,652 A | | 1/1990 | Rudy et al. |
| 4,935,131 A | * | 6/1990 | Pindar ......................... 210/160 |
| 5,102,536 A | * | 4/1992 | Wiesemann .................. 210/400 |
| 5,116,490 A | * | 5/1992 | Fontenot ..................... 210/158 |
| 5,419,832 A | * | 5/1995 | Heinen et al. .............. 210/160 |

FOREIGN PATENT DOCUMENTS

| | | |
|---|---|---|
| DE | 1138740 B | 7/1959 |
| DE | 10654132 A | 3/1998 |
| FR | 749373 A | 7/1933 |

* cited by examiner

*Primary Examiner*—Christopher Upton
(74) *Attorney, Agent, or Firm*—Venable LLP; Robert Kinberg; Stuart I. Smith

(57) ABSTRACT

The invention relates to a sieving device for mechanically separating and extracting solid bodies or solid matter from a liquid current, in particular, to sieve gratings for process or effluent currents or for use in sewage treatment plants or hydroelectric power stations. Said device comprises a number of sieving panels (2, 2', 2") which are substantially arranged in a transverse direction to the direction of flow of the liquid current, are linked together, and which form a revolving endless sieve belt (1) immersing into the liquid current (20). The device also comprises a drive for the endless sieve belt (1), whereby the sieving panels (2, 2', 2") are arranged successively in such a way that the revolving motion of the endless sieve belt (1) is comprised within one single plane which lies substantially perpendicular to the direction of flow of the liquid current (20).

43 Claims, 10 Drawing Sheets

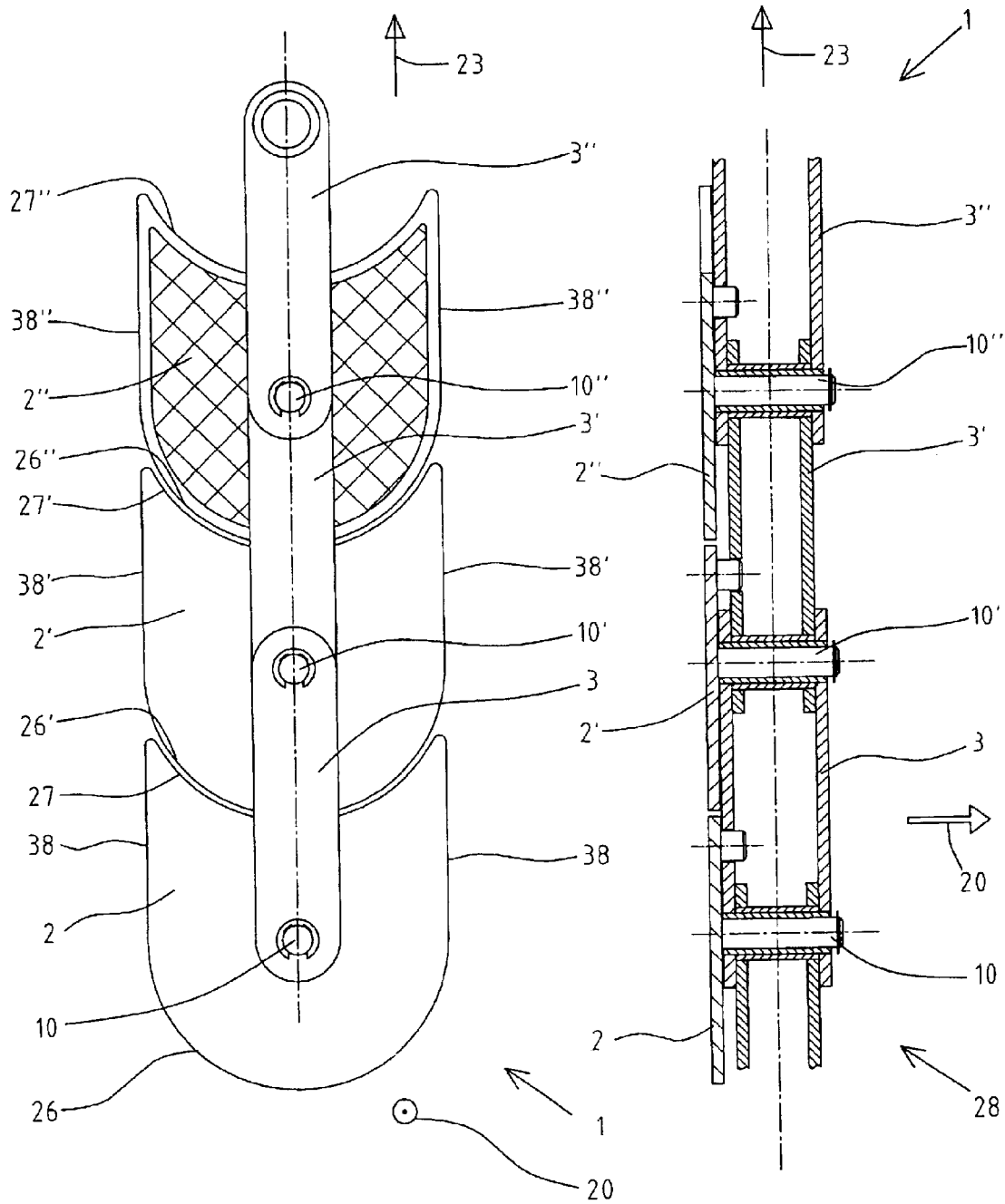

SIEVING DEVICE

CROSS-REFERENCE TO RELATED APPLICATIONS

This application constitutes the national entry of International Application PCT/DE00/02210 filed Jul. 1, 2000, and claims the rights of priority of No. 19935321.1 filed Jul. 28, 1999, in Germany, the subject of these applications being incorporated herein by reference.

BACKGROUND OF THE INVENTION

The invention relates to a sieving device for mechanically separating and extracting solid elements, solid bodies, or solid matter from a liquid flowing in a sluice channel, in particular, to sieve or filter gratings for process, cooling water or effluent currents or for use in sewage treatment plants or hydroelectric power stations.

Such sieving devices are usually equipped with a number of sieving panels which are substantially arranged in a transverse direction to the direction of flow of the liquid current, said sieving devices normally being linked together and forming a revolving endless sieve belt immersing into the liquid current. The devices also comprise a drive for the endless sieve belt, which preferably enables continuous separation and extraction of the solid matter from the liquid current. Generally, in the so-called "transverse flow embodiment", the endless sieve belt completely covers the cross-section of the liquid current. Therefore, the solid matter cannot pass through the sieving device, as long as its dimensions are no larger than the gap width or the mesh size of the sieving panels. It thus becomes deposited on the sieving panels.

The solid matter from the liquid current which has been deposited on the sieving panels is guided upward by the revolving motion of the endless sieve belt and discharged or removed at a discharge point located above the water level. By spraying off the sieving panels at the discharge point, the sieving panels can be thoroughly cleaned before they are re-submerged in the liquid current.

Such Sieving Devices Are Known in Various Embodiments:

One version comprises an endless sieve belt composed of rectangular sieving panels which are linked together by articulation. The individual sieving panels can be pivoted with respect to one another around a horizontal axis. The endless sieve belt is submerged in the liquid current, so that the liquid current flows through a section of the endless sieve belt that faces upstream and a section that faces downstream. The upstream-facing section and the downstream-facing section of the endless sieve belt are linked together by an upper and lower reversal device. A spraying device for the sieving panels is generally located at the upper reversal device.

One disadvantage of this state of the art, which is also called the "transverse flow" embodiment, is that the desired cleansing effect of the liquid current has already essentially been achieved when it flows through the upstream-facing section of the endless sieve belt, even though the liquid current must still also pass through the downstream-facing section of the endless sieve belt. This means that the inevitable pressure loss which occurs upon flowing through the endless sieve belt is doubled.

This pressure loss results in what is normally an undesired drop of the liquid level, which must be raised again to some extent by using pumps and similar devices.

This pressure loss is disadvantageous both for effluent plants, in which equalization must be achieved by pumps or other measures, and for cooling water plants, which are a preferred area of use for this invention. Large primary cooling water pumps are present in cooling water plants for the entire volume of water. This additional pressure loss results in a lower water level in the pump chamber, for which the cooling water pumps must compensate. This leads to significant excess energy costs and thus excess operating costs. The required length of construction may also be disadvantageous, especially for cost reasons.

In another version of known sieving devices, the liquid current is divided by structural means so that the inevitable pressure loss due to the cleansing effect only occurs in one permeated sieving panel, i.e. about half of the liquid current is deflected about ninety degrees to the left and to the right. In this case, the endless sieve belt is submerged in the liquid current in such a way that the sieving panels are arranged along the original direction of flow of the liquid current. Half of the divided liquid current is then guided to the left through the left section of the endless sieve belt, and the other half of the liquid current is guided to the right through the right section of the endless sieve belt. After they flow through the endless sieve belt, both halves of the liquid current are deflected again and reunited.

This second version may also be constructed in such a way that the liquid current flows outward through the endless sieve belt from the inside of the endless sieve belt, or vice versa. These embodiments are also designated as "from in to out" or "from out to in", as appropriate. Of course, the advantage of the liquid current only flowing once through the endless sieve belt, which results in a smaller pressure loss, is countered by the disadvantage of expensive structural measures. Additionally, substantial reduction factors arise due to the means for changing the direction of flow of the current, which cause a reduced flow rate capacity or increased size of the equipment. Furthermore, the double deflection of the liquid current causes a disproportionately large assembly length in the direction of flow of the combined current. This is often either not an option at all, or it is only an option if one is willing to accept substantial additional costs.

In order to solve these problems, the applicant proposed in its application DE 19654132 A1 to equip a sieving device of the first kind described above with sieving panels which can be pivoted outward from the downstream-facing rear section of the endless sieve belt to free the sluice current in a substantially open position. Structural measures according to the second version described above are not necessary in this case. The current essentially only flows through the sieving panels once. Thus, the total loss of pressure remains conveniently small. This will, however, complicate the construction of the endless sieve belt, and some effort must be made to guarantee the water-tightness of the closed sieving panels in the forward section of the endless sieve belt.

Furthermore, this transverse flow embodiment also is disadvantageous in that a portion of the debris retained on the sieving panels that revolve from the wastewater side to the clean water side is conveyed from the wastewater side to the clean water side by the panels. This contaminates the clean water side.

Both the "in-out" and the "out-in", and especially the "transverse flow" embodiments of the state of the art have the disadvantage that debris collects on the bottom in the area between the sieving panels due to sedimentation processes. In time, this can obstruct the course of the sieving panels. Furthermore, the construction of known devices is costly, since they all require two chain hoists (in/out or left/right) to transport the sieving panels.

SUMMARY OF THE INVENTION

Based on this state of the art, the object of the invention is to create a sieving device of the type described at the beginning of this text which combines the smallest possible loss of pressure in the liquid current with a small length of construction in the direction of the current flow of the device and a simple design for the endless sieve belt.

This problem has been solved by the invention of a sieving device with the features as described herein.

Preferred embodiments and additional improvements of the invention are shown in the following description with the corresponding figures.

A sieving device according to the invention for mechanically separating and extracting solid elements, solid bodies, or solid matter from a liquid flowing in a sluice channel comprises a number of sieving panels which are substantially arranged in a transverse direction to the direction of flow of the liquid current and form a revolving endless sieve belt immersing into the liquid current. The sieve belt comprises a plurality of sieving panels which are sequentially arranged adjacent to one another in the direction of motion of the endless sieve belt and form a common sieving surface in the sluice channel. The device also comprises a drive for the endless sieve belt, wherein the sieving panels are arranged successively on the endless sieve belt in such a way that the revolving motion of the endless sieve belt is comprised within one single plane.

This invention recognized that the articulated connection between the individual sieving panels may be reconfigured in such a way that the concatenated motion of the sieving panels is not perpendicular to the plane of motion of the endless sieve belt, as was consistently the case in the prior art, i.e., the pivotal axes between the sieving panels lying along the operative plane of the endless sieve belt. Instead, according to the invention, the individual sieving panels can be pivoted with respect to one another in the operative plane of the endless sieve belt, so that the endless sieve belt does not need two sections placed behind each other in the direction of flow.

Thus, the invention combines the advantages of both versions of the sieving devices described above, without having their disadvantages: The liquid current either flows through one or the other section of the endless sieve belt exactly one time, and moreover therefore only has to pass one single sieving panel, which results in a conveniently low loss of pressure. Since both sections of the sieve belt are arranged side by side to one another instead of one behind the other, there is no need to deflect the liquid current, so that costly construction measures can be avoided and the length of the entire device's construction can be substantially reduced. This may represent a significant economic advantage by substantial savings in the costs of construction.

However, the device according to the invention does not only have advantages with respect to its lower loss of pressure and its shorter length of construction, but it also avoids the problem of conveying debris from the wastewater side to the clean water side, since one side of a sieving panel is always facing the wastewater side and the other side is always facing the clean water side. Thus, no "carry-over" of debris to the clean water side will occur. In addition, debris does not collect in the sieving device at the bottom between the sieving panels, because there is no such structural gap between the sieving panels. A simplified design results from the fact that only one chain (or, alternatively, another drive mechanism) is required to drive the endless sieve belt.

According to one additional preferred feature, it is proposed that the plane of the revolving motion of the sieving panels is arranged substantially perpendicular to the direction of flow of the liquid current.

According to another advantageous feature, it is proposed that the sieving device comprises a guide in which at least some of the sieving panels are guided laterally for stability purposes. To this end, a particular embodiment may be equipped in such a way that the sequential sieving panels in the endless sieve belt lie adjacent to one another without being linked to each other by any connectors. In this instance, the sieving panels could be set in a revolving motion by a drive which moves one or more sieving panels in their direction of motion.

For example, a hydraulic valve tappet drive with one or more hydraulic cylinders is suitable for this purpose. It may be equipped with a backstop, e.g. a ratcheting catch mechanism, in order to prevent the sieving panels from moving backwards. Such backward motion could be caused by the fact that the sieving panels that are lifted from the liquid and covered with debris are heavier than the panels that have been cleaned off and are returning to the liquid. This would create restoring torque acting against the revolving motion of the endless sieve belt. If the sieving panels are not linked to one another, the drive force that is exerted on one or more sieving panels is transferred from one sieving panel to another along the endless sieve belt by the contiguous sieving panels. An essentially continuous motion is achieved with at least two hydraulic cylinders if one cylinder has already begun its function of propulsion before the other has ceased its function.

In a preferred embodiment, the sieving panels of the device according to the invention are linked together by means of connectors, e.g. connecting rods. This has advantages with respect to transferring the force for moving the endless sieve belt in its revolving motion and to guiding the sieving panels. It is especially preferable for the connectors to be part of a drive chain for the endless sieve belt, particularly if they are the links of a drive chain. This makes an advantageous design possible by using a small number of necessary components.

The sieving panels may have a circular or polygonal structure. However, for these embodiments, it may be necessary to deal with the disadvantage that two adjacent sieving panels will at least partially overlap. This means that the liquid will have to flow through two sieving panels in this area. Furthermore, the lateral covering of the sieving panels to prevent the unfiltered flow of liquid is more difficult with such embodiments, and this could make it necessary to use special inserts which cover the remaining gaps between adjacent sieving panels in order to prevent the flow of liquid.

There are particular advantages if the sieving panels are crescent-shaped. This essentially means a shape in which the forward and rear ends of a sieving panel, with respect to the direction of motion of the sieving panels, are shaped like a section of the arc of a circle. Preferably, the radii of the circles that form the outer contours on the forward and rear ends will be the same. This embodiment has the advantage that sieving panels can be moved sequentially and in permanent contiguous contact along the outer contours formed by the circular sections both in a straight line and pivoted about a reversal device. This may be done without creating a gap between adjacent sieving panels through which unfiltered liquid could pass when there is a change of the direction of motion of the sieving panels, such as when they are being deflected.

However, it may not be desirable for the sequential sieving panels in the endless chain to be in permanent contact, e.g. because of the friction associated with this, or it may not be feasible for technical reasons, such as the required level of precision in manufacturing or the selected drive mechanism. In such circumstances, the sequential sieving panels may be arranged on the endless sieve belt with a small gap between one another, whereby the distance of the gap is conveniently no larger than the width of the sieve's mesh.

In some embodiments, however, it may be useful or necessary because of the design to make the distance of the gap between the sequential sieving panels on the endless sieve belt larger than the width of the sieving elements' mesh. In this case, additional sealants could be provided to seal the gap. For example, such sealants could be elastically deformable parts, a covering sealing strip, or a tongue and groove system in which the tongue of a sieving element is inserted into the groove of an adjacent sieving element.

According to a first embodiment, the crescent-shaped sieving panels will preferably be configured in such a way that their outer contours are formed by two sections of two intersecting circles with the same radius. The midpoint of the first circle, which forms the convex section of the outer contour of the sieving panel, lies over the second circle, which forms the concave section of the outer contour of the sieving panel. Because of this configuration, it is possible to pivot the sieving panels with respect to one another within the plane of their operative surface without creating gaps between them and without causing the sieving panels to strike each other when pivoting. If the panels struck, this would cause a double overlapping of the sieving surface, which would be detrimental to the optimization of pressure loss.

These advantages are also obtained with a second embodiment of the crescent-shaped sieving panels in which the outer contours of the crescent-shaped sieving panels are formed by two non-intersecting sections of two circles with the same radius and two rectilinear or arced connecting sections that connect the circular sections. This type of sieving panel is longer than that described in the first embodiment due to the connecting sections. Therefore, they have an extended crescent-shaped length, which has the advantage that there may be fewer sieving panels on an endless sieve belt of a given length.

However, the larger ratio of the longitudinal spacing of the endless sieve belt to the width of the sieving panels can also be disadvantageous in comparison with the first embodiment. This is due to the fact that the deflection of the endless sieve belt will preferably occur around articulated joints whose axes are in the midpoint of the circles that form the circular sections of the outer contours. If the distance between them is larger due to the connecting sections, a larger curve radius is required to deflect the endless sieve belt. Contrary to this, in the first embodiment of the crescent-shaped sieving panels, a conveniently smaller curve radius results during the deflection of the sieving panels.

An endless sieve belt according to this invention with such sieving panels can be implemented quite simply in that the crescent-shaped sieving panels are linked by connectors, in particulars connecting rods, whereby the connectors are coupled on the one hand to a sieving panel at the midpoint of the first circle, which forms the convex section of the outer contour of this sieving panel. On the other hand, the connectors are coupled to the adjacent sieving panel at the midpoint of its first circle, which forms the convex section of its outer contour, and they can be displaced along the convex section of the outer contour of the adjacent sieving panel.

These connectors can also be guided along the convex portion of the outer contour of the associated adjacent sieving panel for stability reasons.

It is beneficial to place the connectors of the individual sieving panels on the clean water side of the endless sieve belt in order to prevent detrimental buildup of solid matter, especially on the articulated parts.

There are particular advantages if the totality of the connectors of the linked sieving panels, especially if they are made from connecting rods or chain links, form a drive chain for the endless sieve belt. It is then possible to run the drive chain made up of the linked connectors simply by a motor-driven sprocket wheel on an upper reversal device of the endless sieve belt. Additional moving parts or coupling elements are thus not required to drive the endless sieve belt.

In general, it may be advantageous for the drive to comprise a drive chain that runs across an upper sprocket wheel on an upper reversal device of the endless sieve belt and across a lower sprocket wheel on a lower reversal device, since a chain drive represents a preferred embodiment of a drive for the endless sieve belt. In this case the upper sprocket wheel may preferably be propelled by means of a drive motor.

For special uses, the endless sieve belt can also be propelled by a laterally situated drive unit, to which at least a part of the sieving panels on at least a part of the revolving path of the endless sieve belt may be connected. Such a drive unit may also conveniently comprise a chain. Additionally, other drives may also be implemented, such as a friction wheel, a hydraulic valve control, a linear motor, a cogged belt drive, etc.

Another favorable feature is that there may be sieve belt struts for stability reasons which are located on the clean water side of the endless sieve belt, preferably near the central axis of the sieving panels. They can function to absorb the force loaded on the sieving panels that is caused by the current and to support the sieving panels. Cross-bars may also conveniently be located between the struts or on the walls or bottom of the sluice channel in order to guarantee that the endless sieve belt is securely supported. The sieve belt struts and the cross-bars will thus preferably be mounted in a fixed position in order to increase the stability of the sieving device according to this invention.

The sieving panels can be supported on the sieve belt struts in a manner sliding across them. In a preferred embodiment, there are rotating struts, e.g. support rollers or balls to support the endless sieve belt or the sieving panels on a sieve belt strut, which enable a frictionless revolving motion of the endless sieve belt by rolling. For example, the rotating struts may be located on the sieving panels or on the connectors between the sieving panels.

It is preferable for the sieving device according to this invention to have a configuration in which the downward-moving part of the revolving endless sieve belt and the upward-moving part of the revolving endless sieve belt respectively cover the right or left half of the liquid current, whereby there is a fixed center guide arranged between them. The center guide may be mounted securely at its lower end for stability reasons, so that it will not break away due to the pressure of the liquid current. The center guide has the advantage of the fact that at least a portion of the sieving panels may be guided in it, which conveniently increases the stability of the entire device.

Preferably, sieving panels are guided in the center guide. This guidance may, for example, be performed by gliding or by using interior rotating guide elements that are located on the sieving panels or the connectors, e.g. guide rollers or balls.

At least some of the sieving panels should be guided in a guide device located laterally, preferably along the outer wall adjacent to the liquid current, so that a gap through which the liquid would flow with no cleansing effect cannot occur between the endless sieve belt and the outer wall due to the pressure of the liquid current. It would be useful for the guide to be set into the outer wall itself. This guidance may, for example, be performed by gliding or by using exterior rotating guide elements that are located on the sieving panels or the connectors, e.g. guide rollers or balls.

The panels of the sieving device according to the invention will preferably drop down into the guide devices in such a way that the resulting sieving surface of the endless sieve belt substantially covers the liquid current without any gaps. This is particularly important for circular sieving surfaces.

The guide devices preferably have a grooved shape, and some or all of the sieving panels are preferably equipped with runners on their sides facing the guide device, wherein the runners are in engagement with the grooved-shaped guide devices. These measures will make it possible to implement a particularly simple and robust guidance of the endless sieve belt according to this invention.

In another embodiment of the invention, there are a plurality of spray jets to spray off the sieving panels of the endless sieve belt that are lifted from the liquid current. There is also a debris channel on the side of the endless sieve belt that faces the spray jets. It is preferable for the spray jets and the debris channel to extend both across the downward-moving part and the upward-moving part of the revolving endless sieve belt.

In this way, the sieving panels are cleaned especially well, because such a spray system operates like an anti-parallel system. It may be particularly convenient to use jets with a self-cleaning spinning effect.

According to one convenient embodiment, the sieving panel is made of a sectional frame and a sieving element held in place by said frame. The mesh size of the sieving panels or the sieving elements is preferably between 0.1 mm and 10 mm, preferably between 2 mm and 4 mm. In the typical situation in which these sieving panels are used, the sieving device according to this invention offers the most significant advantages in comparison to the state of the art. Another convenient feature is that the sieving panels may have a debris pocket on their rear side with respect to the direction of motion. This pocket may, for example, be formed by a chamfer of a sectional frame or a cavity, and serves to remove from the liquid the debris or solid matter falling off of the sieving panel.

In the simplest case, the endless sieve belt is configured for its revolving motion in such a way that the sieving panels are all immersed in and lifted out of the liquid current in a rectilinear motion, whereby they are deflected by a substantially circular motion at an upper and a lower point of deflection.

Additional features and special embodiments of the invention may be seen in the exemplary embodiments described in greater detail and shown in the figures below.

BRIEF DESCRIPTION OF THE DRAWINGS

The figures show:
FIG. 7 a diagrammatic illustration of a variation of FIG. 2;
FIG. 8 a side view of FIG. 7.

DETAILED DESCRIPTION OF PREFERRED EMBODIMENTS

Figure 1:
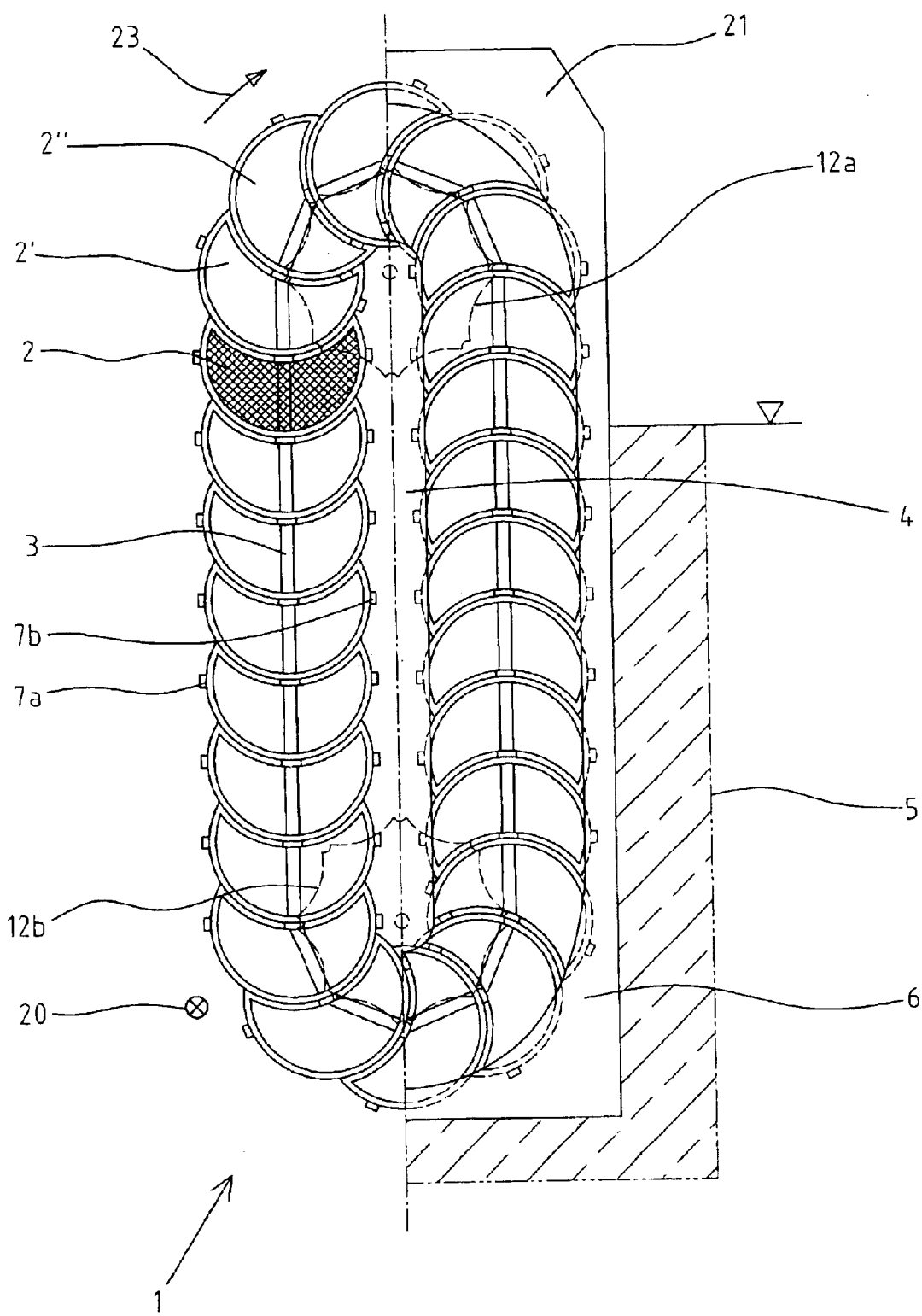
FIG. 1 a diagrammatic frontal view of a sieving device according to this invention.

FIG. 1 shows in a diagrammatic frontal view a sieving device according to this invention with an endless sieve belt 1, in which the left half of the illustration shows only the endless sieve belt 1. This endless sieve belt 1 is arranged transversely to the direction of flow 20 of a liquid current not depicted here, and the current flows through it at an angle perpendicular to the plane of the illustration. It comprises a number of crescent-shaped sieving panels 2, 2', 2", which are linked together by connectors 3 in such a way that they are lifted upward in the plane of the illustration from the liquid current as they revolve along their direction of motion 23 in the left section of the figure. They are deflected at an upper point of deflection within the plane of the illustration, and then immersed down into the liquid current in the right-hand section. Finally, they are deflected once again at a lower point of deflection in the same plane of the illustration as before in order to form an endless sieve belt 1 which is a closed loop. The sieving panels 2, 2', 2" are thus pivoted with respect to one another at the points of deflection in such a way that the pivotal axis is perpendicular to the plane of the illustration. For the sake of clarity, only the mesh of one of the depicted sieving panels 2 is shown. The connectors 3 are part of a chain that functions to propel the endless sieve belt 1. They are deflected by an upper sprocket wheel 12a, which is driven by a motor, and a lower sprocket wheel 12b. The sprocket wheels 12a, 12b shown in the example each have eight sprockets; in other embodiments more or fewer sprockets re also possible depending on the radius of deflection and the dimensions of the sieving panels 2, 2', 2".

A center guide 4 is located between the upward- and downward-running rectilinear sections of the depicted endless sieve belt 1. It borders the endless sieve belt 1 on the inside. On the outside, the belt borders the outer wall 5 of the liquid current. This outer wall comprises grooved guides 6 on its edges in which the sieving panels 2, 2', 2" are guided by runners 7 resting on them. The guides 6 expand into current diverter plates at the lower point of deflection of the endless sieve belt 1 in order to prevent the current from flowing around the sieving panels 2, 2', 2".

As may easily be seen in FIG. 1, the sieving panels 2, 2', 2" drop so far down into the guide 6 and into the center guide 4 that the fringe gaps that are always present due to the crescent shape of the sieving panels 2, 2', 2" on the endless sieve belt 1 are covered over by the guide 6 and the center guide 4. Therefore, the sieving surface that results from the combination of the sieving panels 2, 2', 2" of the endless sieve belt 1 almost completely covers over the cross-section of the liquid current.

The sieving panels 2, 2', 2" are guided by outer guide rollers 7a at the outer wall 5 or guide 6, and with inner guide rollers 7b at the center guide 4.

Figures 2, 3:
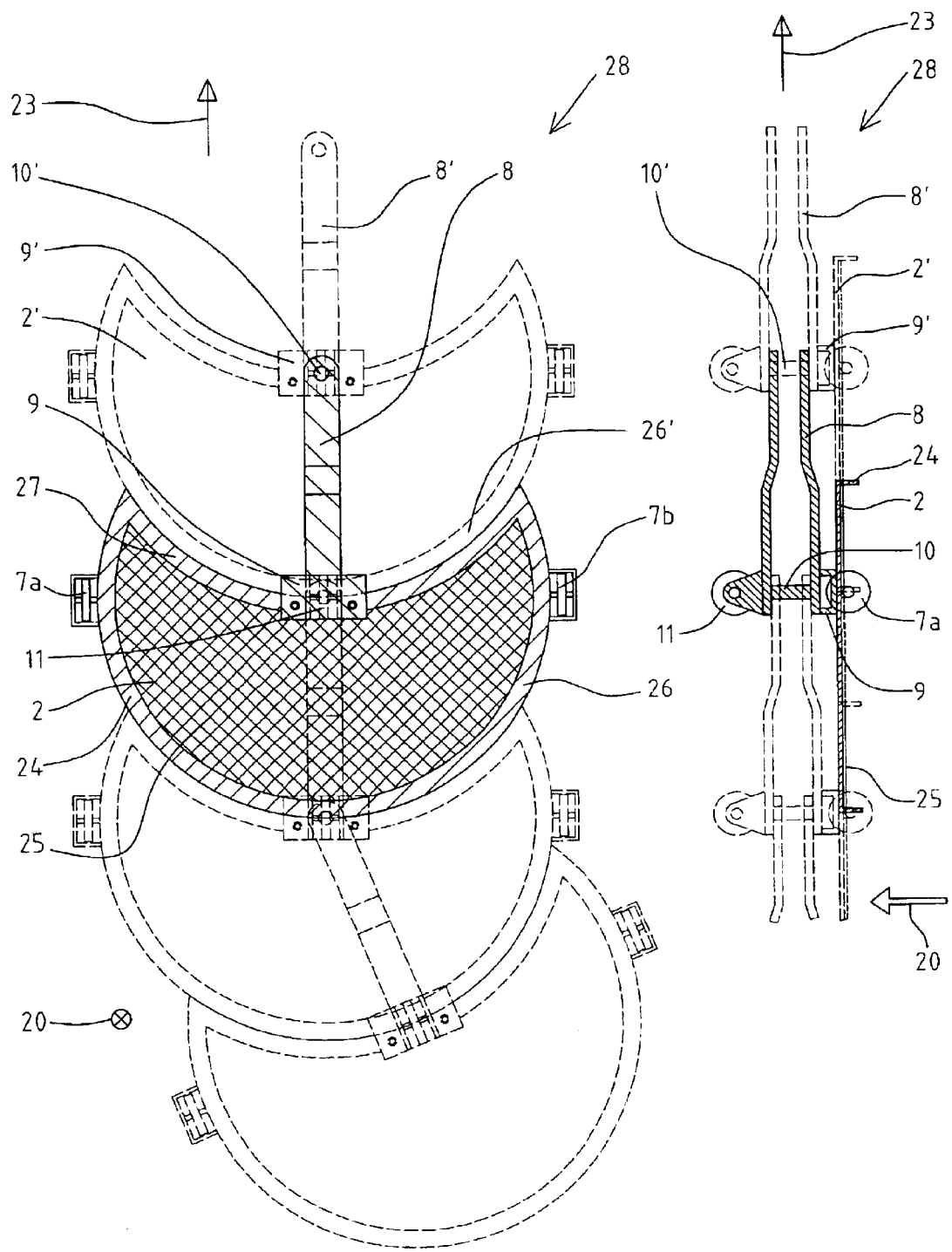
FIG. 2 a detailed view from FIG. 1.
FIG. 3 a side view of the detailed view from FIG. 2.

FIG. 2 shows a detailed view from FIG. 1 which further clarifies the structure of the sieving panels 2, 2'. In conjunction with FIG. 3, which is a side view of the illustration from FIG. 2, the linking of the sieving panels 2, 2' by the connectors 3, which are made of connecting rods 8, 8' in this figure, is described in greater detail.

The sieving panels 2 each comprise a sectional frame 24 and a sieving element 25 which is set into it or held in place by the sectional frame 24 and which has mesh channel openings.

The outer contour of the sieving panel 2 is circumscribed by two intersecting sections 26, 27 of circles with the same radius. The first section 26 forms the convex part of the outer contour and the second section 27 forms the concave part of the outer contour. The midpoint of the circle in the first section 26 is on the concave section 27 of the outer contour, so that two adjacent sieving panels 2, 2' can be pivoted with respect to one another within the plane of the illustration. This may be done without creating a gap in the direction of motion 23 between the convex section 26' of the outer contour of one sieving panel 2' and the concave section 27 of the outer contour of the other sieving panel 2 and without covering over two sieving panels 2, 2'.

The respective articulated connection of two sieving panels 2, 2' is created by using a connecting rod 8 which is permanently fixed to the sieving panel 2 by a mounting plate 9 at one end on the concave section 27 of its outer contour, at the midpoint of the circle that forms the convex section 26 of the outer contour. The rod is mounted on the next mounting plate 9' of the adjacent sieving panel 2' by means of an articulated joint 10' at its other end so that it may be pivoted. This makes it possible for the sieving panels 2, 2' to have the range of motion shown in FIG. 2 wherein the level of stability against the liquid current is nevertheless high.

In FIG. 3, it may be seen how the connecting rods 8, 8' are linked together by an articulated joint, so that the totality of the connecting rods 8, 8' form a continuous link chain, with which the endless sieve belt 1 may be driven. The connecting rods 8, 8' form links of a cranked link chain, in which the articulated joints 10, 10' are formed by the bolts of the link chain. Furthermore, it may be seen that the force of the mounting plates 9 is transferred to the support rollers 11. These rollers rotate on sieve belt struts (not shown in FIG. 3) arranged toward the direction of flow 20 behind the sieving panels 2 and support the endless sieve belt 1. The complete drive chain 28 may be propelled by using a an engaging sprocket wheel, which is not depicted here.

In comparison, the outer guide rollers 7a and inner guide rollers 7b of the sieving panels 2 are engaged in the grooved guide 6 or in the center guide 4, whereby they are able to perform both a guiding and a supporting function.

Figure 4:
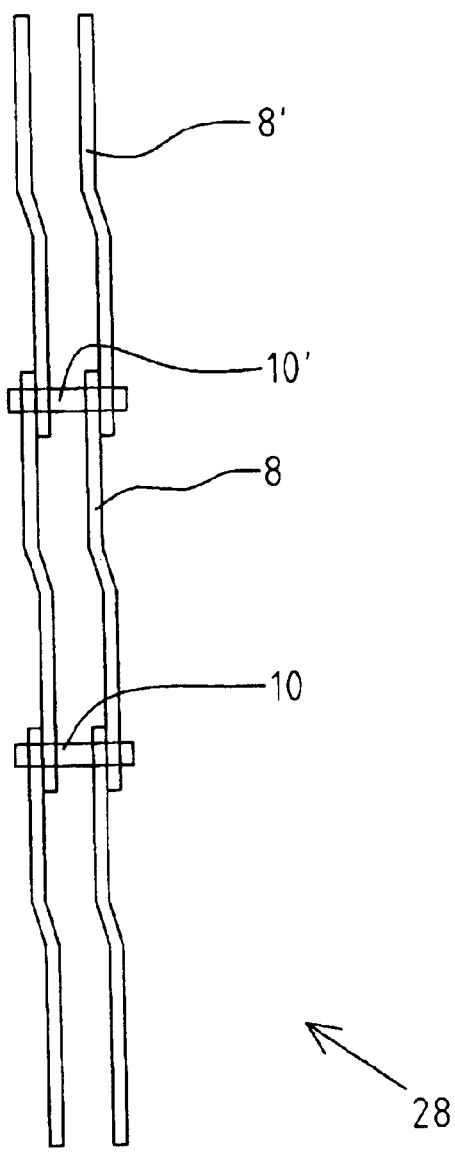
FIG. 4 a diagrammatic illustration of a variation of FIG. 3.

FIG. 4 shows a diagrammatic illustration of an exemplary variation of the drive chain 28 in which the connecting rods 8, 8' are cranked differently. The detailed features of the endless sieve belt and of the sieving panels are not shown in this figure.

Figure 5:
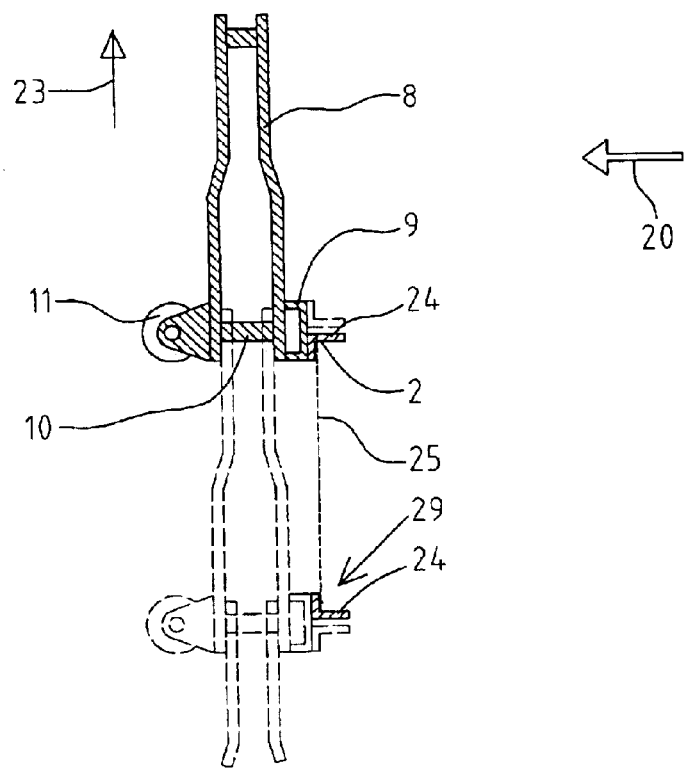
FIG. 5 a detailed view of FIG. 3.

FIG. 5 shows a detailed view of FIG. 3 without the guide roller 7. It may be seen how the sieving panel 2 with its sectional frame 24, to which the sieving element is attached, is mounted to the mounting plate 9.

Figure 6:
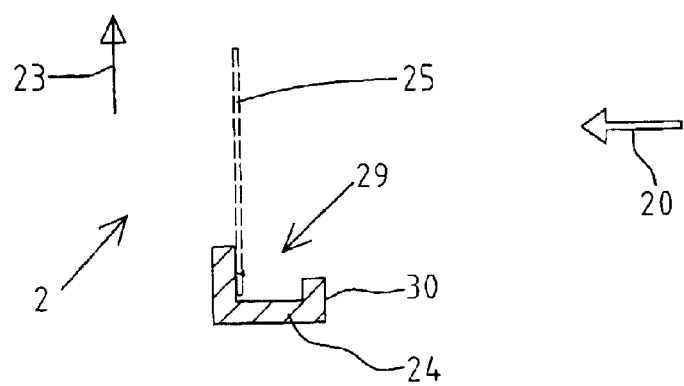
FIG. 6 a modified detailed view of FIG. 5.

In FIG. 6, a modified detailed view of FIG. 5 is shown. Because the sectional frame 24 protrudes at its rear end with respect to the direction of motion 23 beyond the sieving element 25 opposite to the direction of flow (20) (FIG. 5), the rear end of the sieving panel 2 forms a debris pocket 29, which can collect debris or aquatic animals, etc, which fall off of the sieving element 2. In FIG. 6, this debris pocket 29 is equipped with a forward retaining edge due to an additional cranking or beveling 30 of the sectional frame 24 toward its direction of motion 23, which improves its ability to retain the materials in the debris pocket 29.

In FIG. 7, a diagrammatic illustration of a section of a modified endless sieve belt is depicted. The crescent-shaped sieving panels 2, 2', 2" are each connected by a rectilinear connecting section 38 between the convex 26 and concave 27 sections in such a way that the circles, whose sections form both the convex 26 and concave 27 outer contours, do not intersect. The connecting elements 3 are linked together and are also connected on the one hand to a sieving panel 2 at the midpoint of the first circle, which forms the convex section 26 of the outer contour of a sieving panel 2. On the other hand, they may be displaced along the convex section 26' of the outer contour of the adjacent sieving panel 2' and are connected to the adjacent sieving panel 2' at the midpoint of its first circle, which forms the convex section 26' of its outer contour. This makes it possible for the sieving panels 2, 2', 2" to be deflected without opening a gap between them.

In FIG. 7, the sectional frame and the sieving meshwork are only shown in sieving panel 21', and any guide rollers 7a, 7b or support rollers 11 that may be present are not depicted. FIG. 8 shows a diagrammatic side view of an endless sieve belt 1 according to FIG. 7, in which the connectors 3, 3', 3" form a drive chain 28.

Figure 9:
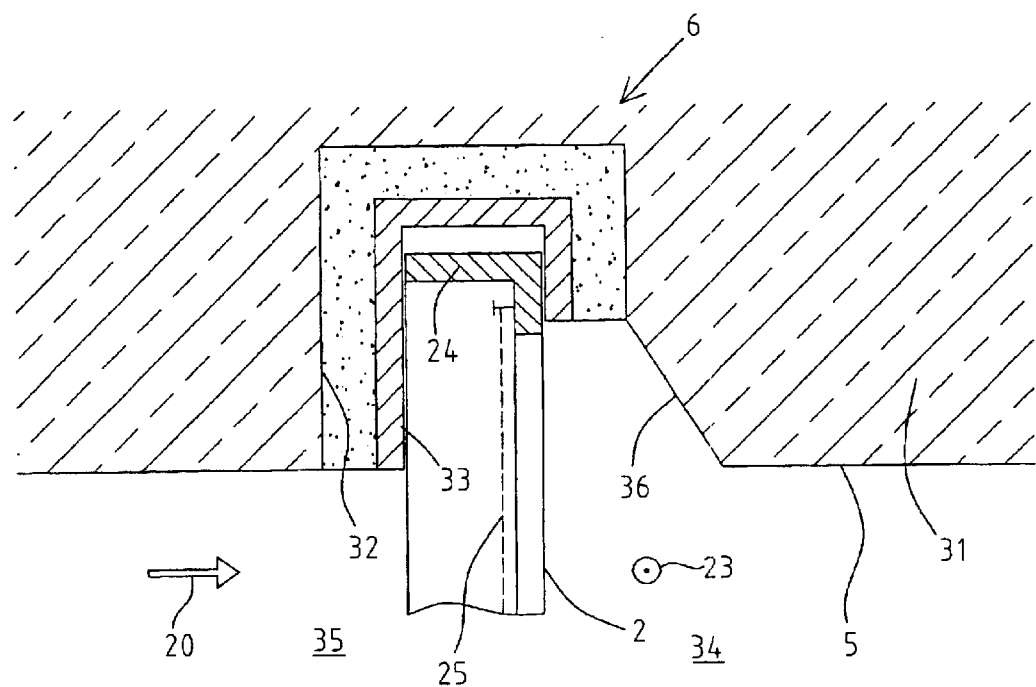
FIG. 9 a lateral guide.
Figure 10:
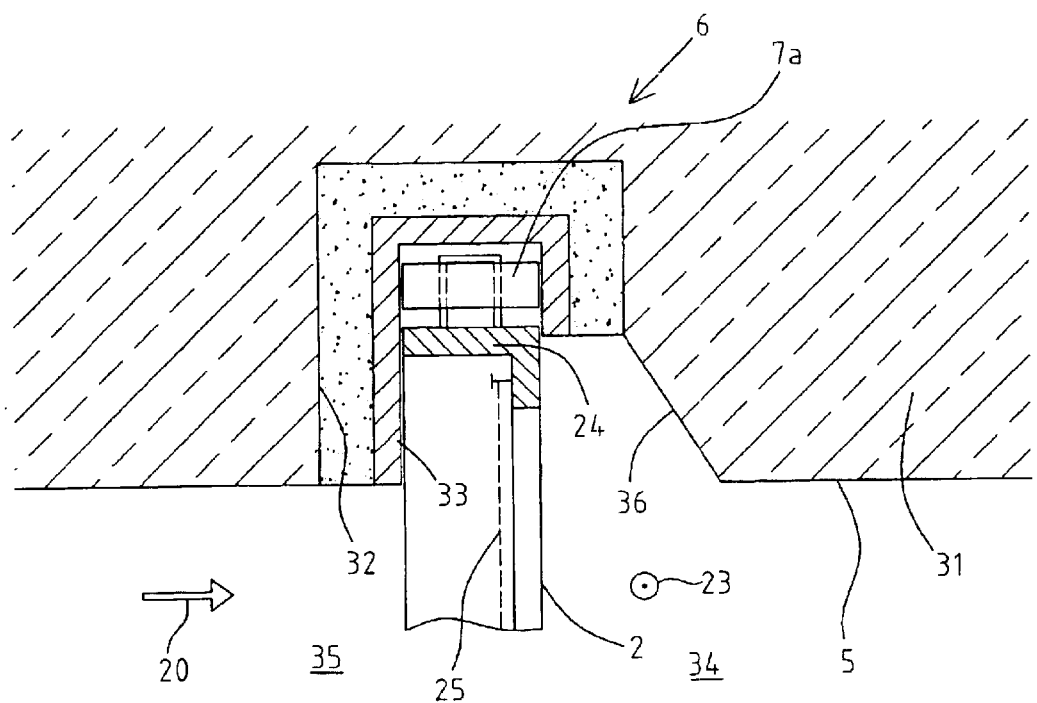
FIG. 10 a variation of FIG. 9.

FIGS. 9 and 10 show lateral guides 6 and supports for the sieving panels 2 in the structure 31. They each comprise a guide groove 32 into which a steel guide profile 33 is set. In FIG. 9, the sectional frame 24 of the sieving panel 2 is guided without rollers, i.e. by gliding along the guide profile 33, whereas there are guide rollers 7a mounted on the sectional frame 24 in FIG. 10.

The bearing surface, i.e. the sectional frame's 24 base on the guide profile 33 in FIG. 9 and the guide roller's 7a base on the guide profile 33 in FIG. 10, is located in a low current cavity in order to minimize the build-up of debris. In contrast thereto, the guide device 6 or the outer wall 5 features a chamfering 36 on the clean water side 34 of the sieving panels 2, which chamfering functions to increase the effective width of the sieving panel 2 through which the liquid can flow. This results in less flow resistance or a higher flow rate, since the sieving surface is larger than it would be in an embodiment without any such chamfering 36.

Figure 11:
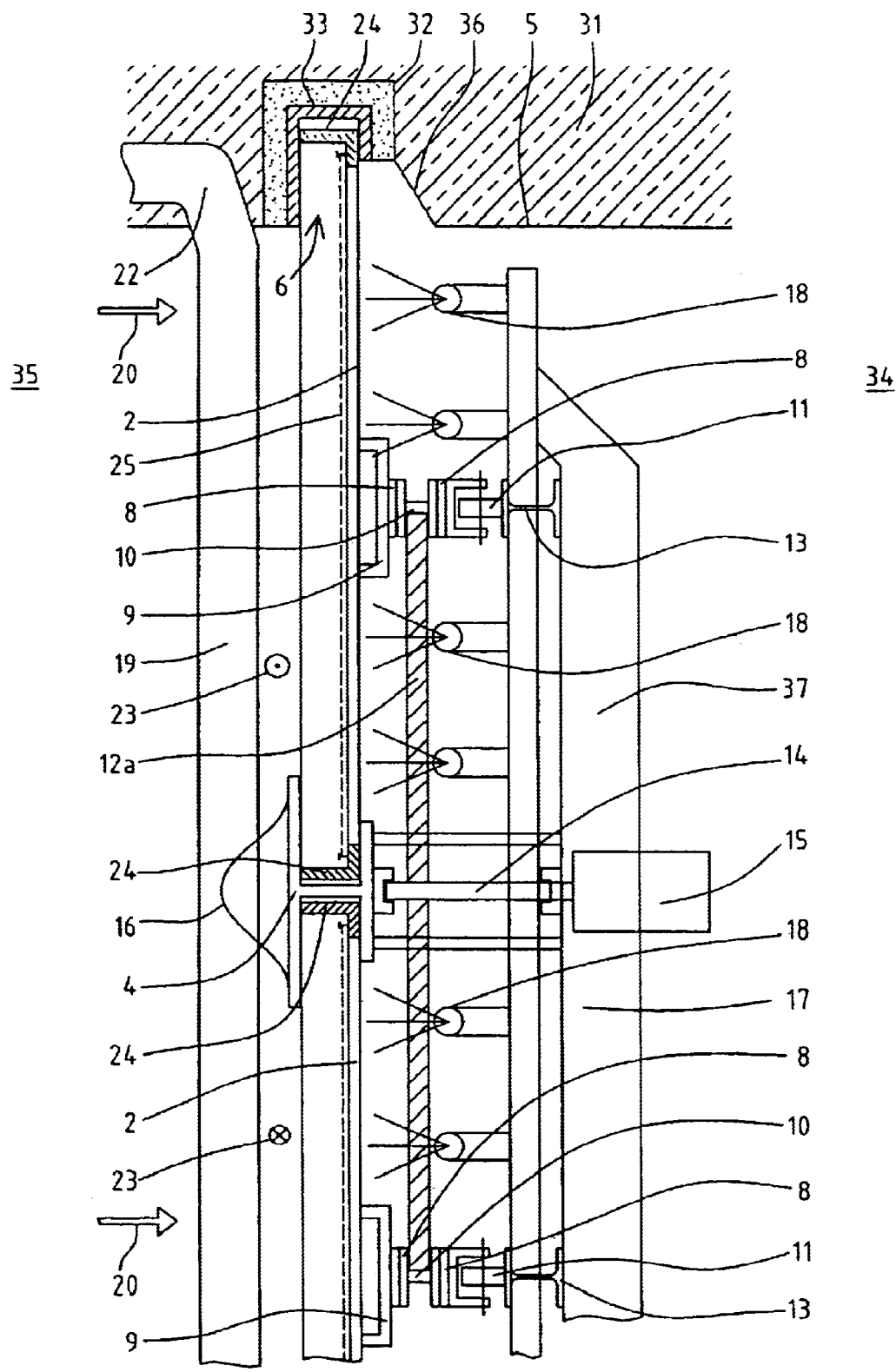
FIG. 11 a sectional top view of the sieving device.

In FIG. 11, a diagrammatic partially cutaway top view in the region of the upper sprocket wheel 12a shows how the endless sieve belt 1 comprising the sieving panels 2 is moved by means of the drive chain 28 which is formed from the totality of the connecting rods 8. The connecting rods 8 are guided past a sprocket wheel 12 at the upper point of deflection of the endless sieve belt 1, whereby the chain bolts which form the articulated joints 10 and are located on the connecting rods 8 have the teeth of the sprocket wheel 12a inserted into them. A drive shaft 14 and a drive motor 15 also function to drive the endless sieve belt 1. The motor may, for example, be designed as a shaft-mounted gearbox motor or as a motor with a transmission gear.

There is a support with sieve belt struts 13 arranged on the clean water side 34 of the sieving panels 2 facing the direction of flow 20 from the wastewater side 35. This support is reinforced by a cross-bar 37, and the support rollers 11 of the sieving panels 2 roll on top of it.

The shape of the grooved guides 6 in the outer walls 5 may also be clearly seen in FIG. 11, in which the sieving panels 2 are guided by means of their outer guide rollers 7a or, as shown in FIG. 11, by gliding. The guidance of the sieving panels 2 in the center guide 4 may also be seen. The panels are guided there by their interior guide rollers 7b or, as shown in FIG. 11, by gliding. The center guide 4 may also be connected to a cross-bar 37 or a sieve belt strut 13 by means of a brace. It is convenient for it to feature a diverter plate, which may have a hydrodynamic indentation 16 on the wastewater side 35.

Finally, FIG. 11 shows the cleansing of the endless sieve belt 1 by means of a spray head 17 which has a plurality of spray jets 18 to spray off the sieving panels 2. The spray head 17 extends along the upward- and downward-moving sections of the endless sieve belt 1, resulting in a double spraying off of the individual sieving panels 2. The solid matter, aquatic animals, etc, that are removed from the sieving panels 2 by the spray jets 18 drop along with the spray into a debris channel 19 located on the wastewater side 35 of the endless sieve belt 1 and are removed by a sluice channel 22.

The direction of the liquid current 20, which flows through the sieving device according to the invention and is cleaned by it, is indicated by an arrow.

Figure 12:
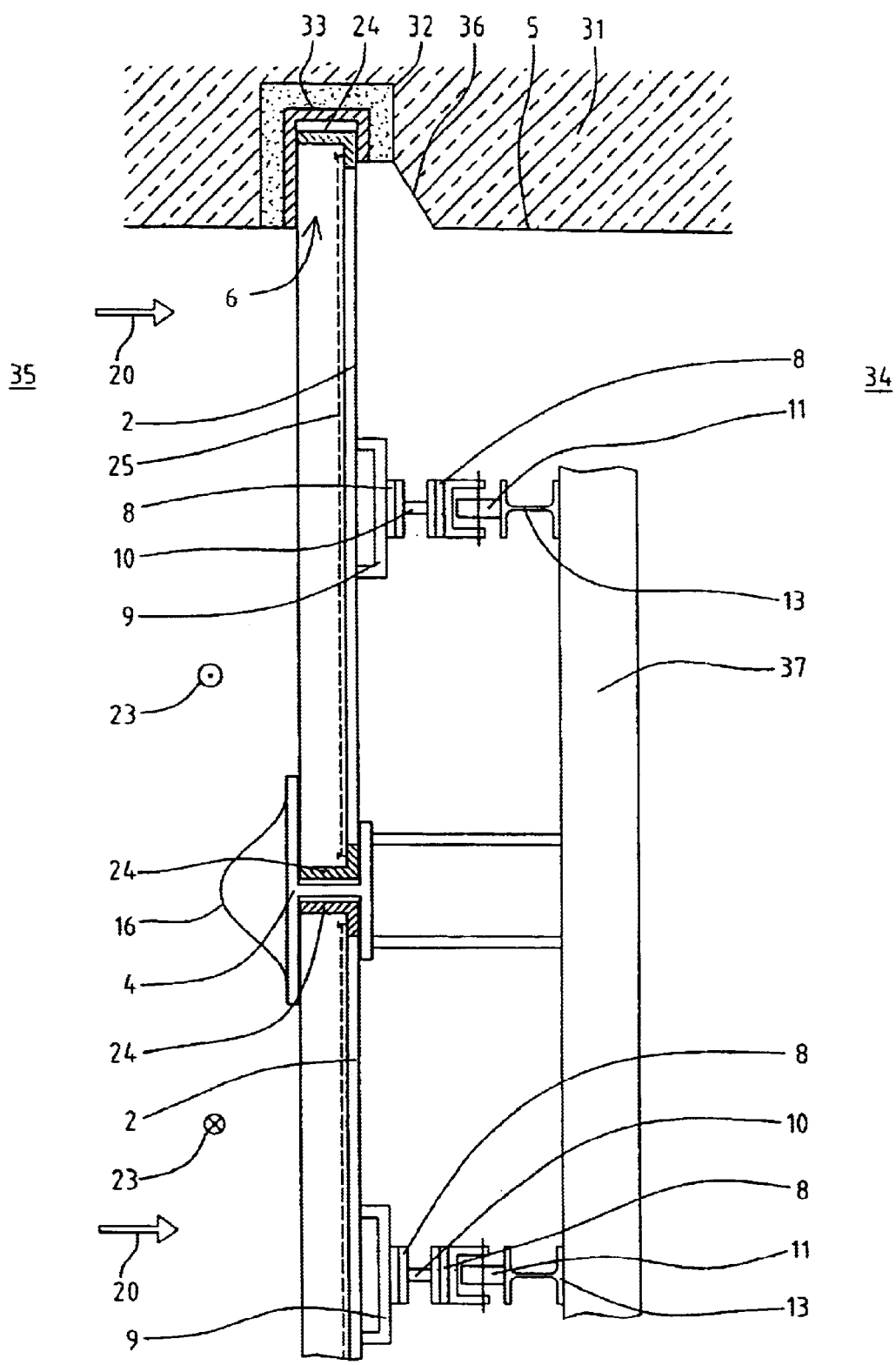
FIG. 12 a first cutaway view of the sieving device.

FIG. 12 shows a cutaway view of the sieving device at approximately mid-height. The illustration thus corresponds to FIG. 11, whereby the upper sprocket wheel 12a, the drive shaft 14, the drive motor 15, the spray head 17 with the spray jets 18 and the debris channel 19 with the sluice channel 22 may not be seen due to the position of the horizontal cutaway section.

Figure 13:
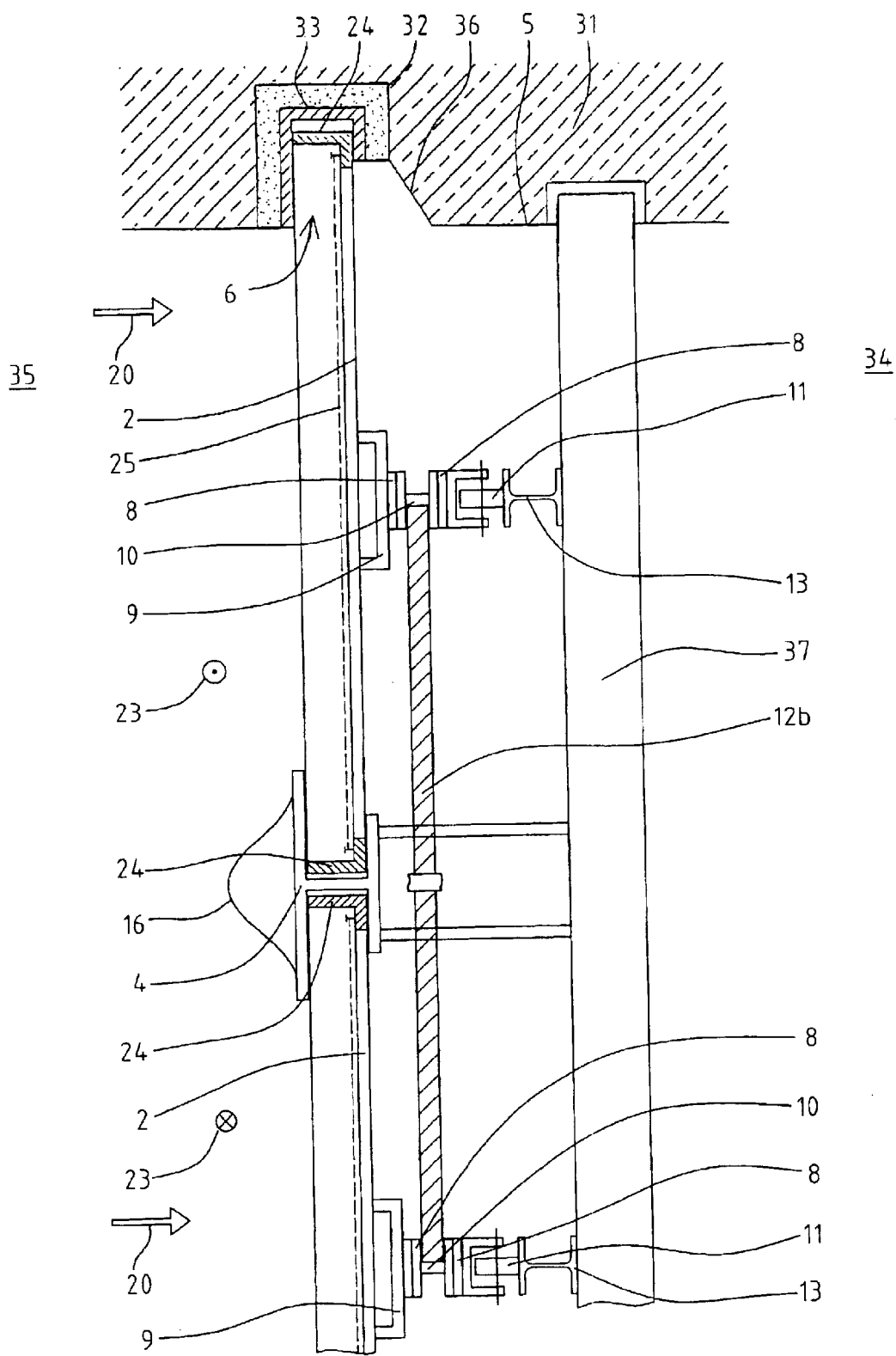
FIG. 13 a second cutaway view of the sieving device and
FIG. 14 an additional frontal view of the sieving device.

FIG. 13 shows a corresponding horizontal cutaway section in the region of the lower sprocket wheel 12b, which is not driven by a motor. The illustration of FIG. 13 thus corresponds to that of FIG. 12, whereby the lower sprocket wheel 12b may also be seen. The cross-bar 37 is anchored in a cavity in the wall 5.

Figure 14:
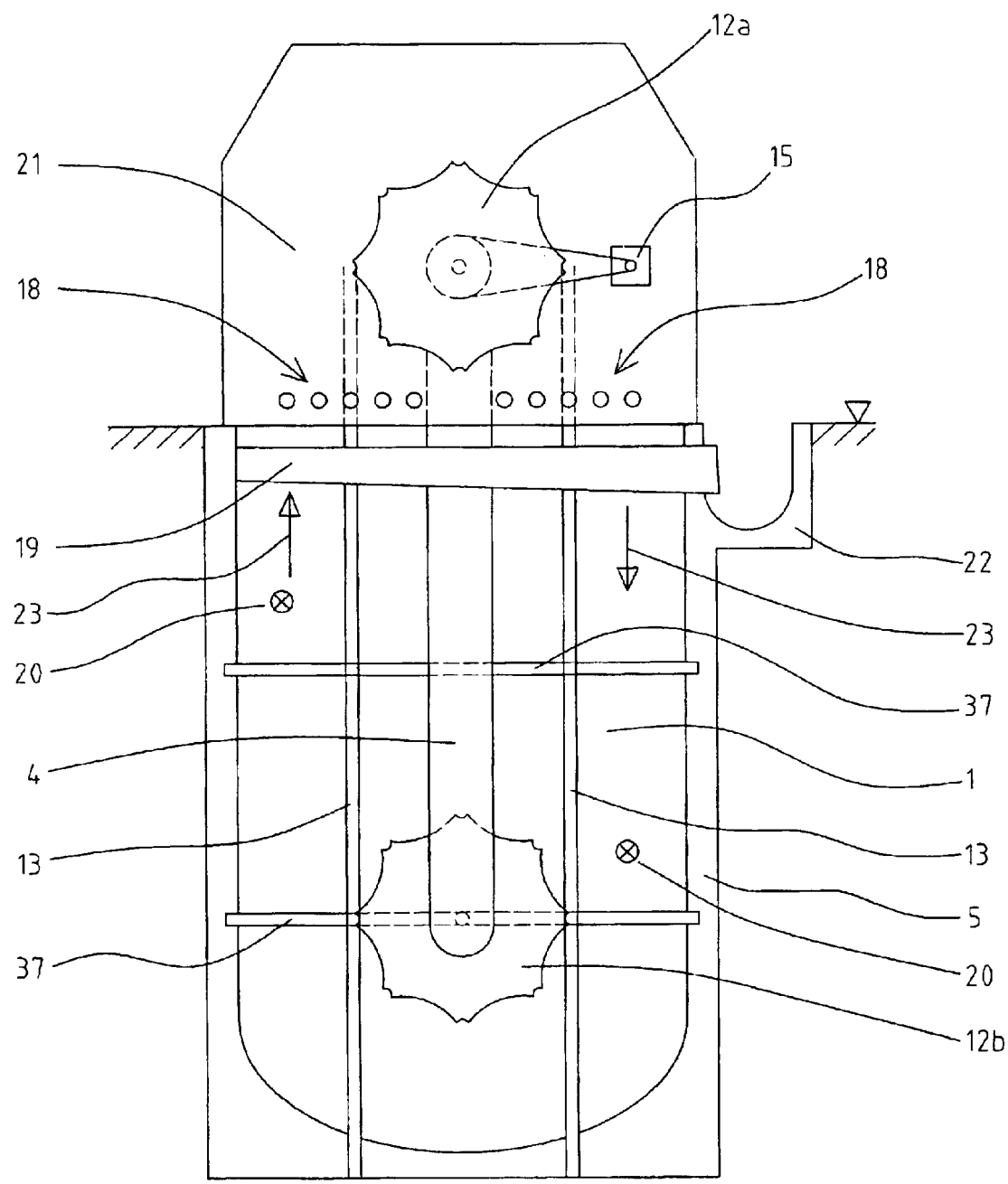

FIG. 14 shows the entire device in a diagrammatic frontal view. The endless sieve belt 1, which is inserted into the outer walls 5 adjacent to the liquid current 20, may be seen next to the center guide 4, the debris channel 19 and the sluice channel 22. Above, the endless sieve belt 1 and the associated drive and cleansing systems are equipped with a cover 21. In a modified form of that of FIG. 11, the drive motor 15 transfers the propulsive force to the diagrammatically depicted upper sprocket wheel 12a by means of a chain. The lower sprocket wheel 12b is also shown, but the sieving panels 2 are not shown for the sake of clarity. This makes it easy to see the perpendicularly running sieve belt struts 13 and the cross-bars 37 depicted in an exemplary fashion, which may be utilized at the desired points in the amount required. The cross-bars 37 can be anchored in the wall 5 or the bottom, as necessary, or they could connect the sieve belt struts 13.

List of Reference Signs

1 Endless sieve belt
2, 2', 2" Sieving panels
3 Connectors
4 Center guide
5 Outer wall
6 Guide
7a Exterior guide roller
7b Interior guide roller
8, 8' Connecting rods
9 Mounting plate
10 Articulated joint
11 Support roller
12a Upper sprocket wheel
12b Lower sprocket wheel
13 Sieve belt strut
14 Drive shaft
15 Drive motor
16 Indentation
17 Spray head
18 Spray jet
19 Debris channel
20 Liquid current
21 Cover
22 Sluice channel
23 Direction of motion (of 1)
24 Sectional frame
25 Sieving element
26 First, convex section
27 Second, concave section
28 Drive chain
29 Debris pocket
30 Beveling
31 Structure
32 Guide groove
33 Guide profile
34 Clean water side
35 Wastewater side
36 Chamfering
37 Cross-bar
38 Connecting section

What is claimed is:

1. Sieving device for mechanically separating and extracting solid components, solid bodies, or solid matter from a liquid flowing in a sluice channel, in particular, sieve or filter grating for process, cooling water, or effluent currents or for use in sewage treatment plants or hydroelectric power stations, with a number of sieving panels which are substantially arranged in a transverse direction to the direction of flow of the liquid current, and which form a revolving endless sieve belt immersing into the liquid current, on which endless sieve belt a plurality of sieving panels which are sequentially arranged adjacent to one another in the direction of motion of the endless sieve belt form a common sieving surface in the sluice channel, and with a drive for the endless sieve belt, characterized in that the sieving panels are arranged successively on the endless sieve belt in such a way that the revolving motion of the endless sieve belt is substantially comprised within one single plane, wherein pivotal axes around which the sieving panels are pivoted at points of deflection of the endless sieve belt are perpendicular to the sieving surface.

2. Sieving device according to claim 1, wherein the plane of the revolving motion of the sieving panels is substantially perpendicular to the direction of flow of the liquid current.

3. Sieving device according to claim 1, further comprising a guide device, in which at least some sieving panels are laterally guided.

4. Sieving device according to claim 3, wherein the sequential sieving panels on the endless sieve belt are adjacent to one another and are not linked together by connectors.

5. Sieving device according to claim 1, wherein the sieving panels are linked together by connectors.

6. Sieving device according to claim 5, wherein the connectors form part of a drive chain for the endless sieve belt.

7. Sieving device according to claim 6, wherein the connectors are links of the drive chain for the endless sieve belt.

8. Sieving device according to claim 5, wherein the connectors are placed on the clean water side of the endless sieve belt.

9. Sieving device according to claim 1, wherein the sieving panels have a circular structure.

10. Sieving device according to claim 1, wherein the sieving panels have a crescent-shaped structure.

11. Sieving device according to claim 10, wherein the outer contours of the crescent-shaped sieving panels are respectively formed by two intersecting sections of two circles with the same radius, whereby the midpoint of the first circle, which forms the convex section of the outer contour of the sieving panel, lies on the second circle, which forms the concave section of the outer contour of the sieving panel.

12. Sieving device according to claim 10, wherein the outer contours of the crescent-shaped sieving panels are respectively formed by two non-intersecting sections of two circles with the same radius and two rectilinear or arced connecting sections which connect the circular sections.

13. Sieving device according to claim 10, wherein the crescent-shaped sieving panels are linked together by connectors, whereby the connectors are each coupled to a sieving panel on one side at the midpoint of the first circle, which forms the convex section of the outer contour of this sieving panel, and are coupled on the other side to the adjacent sieving panel at the midpoint of its first circle, which forms the convex section of its outer contour, and can be displaced along the convex section of the outer contour of the adjacent sieving panel.

14. Sieving device according to claim 13, wherein the connectors are each guided along the convex part of the outer contour of the associated adjacent sieving panel.

15. Sieving device according to claim 13, wherein the connectors are connecting rods.

16. Sieving device according to claim 1, wherein the drive comprises a drive chain which runs across an upper sprocket wheel at an upper reversal device of the endless sieve belt and across a lower sprocket wheel at a lower reversal device.

17. Sieving device according to claim 16, wherein the upper sprocket wheel can be propelled by a drive motor.

18. Sieving device according to claim 1, wherein the drive is a laterally arranged drive unit for propelling the endless sieve belt to which at least a part of the sieving panels can be connected over at least a portion of the revolving path of the endless sieve belt.

19. Sieving device according to claim 1, further comprising sieve belt struts which are located on the clean water side of the endless sieve belt.

20. Sieving device according to claim 19, wherein the endless sieve belt comprises rotating supports for support on a sieve belt strut.

21. Sieving device according to claim 20, wherein the rotating supports are located on the connectors or the sieving panels.

22. Sieving device according to claim 20, wherein the rotating supports are one of support rollers and balls.

23. Sieving device according to claim 19, wherein the sieve belt struts are located near the central axis of the sieving panels.

24. Sieving device according to claim 1, wherein the downward-moving part of the revolving endless sieve belt and the upward-moving part of the revolving endless sieve belt respectively substantially cover the right or left half of the liquid current, whereby a fixed center guide is arranged between the two halves.

25. Sieving device according to claim 24, wherein the center guide is permanently fixed at its lower end.

26. Sieving device according to claim 24, wherein at least some of the sieving panels are guided in the center guide.

27. Sieving device according to claim 26, wherein the sieving panels are guided on the center guide by gliding or by means of interior, rotating guide elements.

28. Sieving device according to claim 27, wherein the interior, rotating guide elements are rollers.

29. Sieving device according to claim 1, wherein at least some of the sieving panels are designed to be guided in a laterally arranged guide device.

30. Sieving device according to claim 29, wherein at least some of the sieving panels are designed to be guided in the outer wall itself.

31. Sieving device according to claim 29, wherein the sieving panels can be guided on the guide device by gliding or by means of exterior guide rollers.

32. Sieving device according to claim 29, wherein the sieving panels can be dropped down into the guide device in such a way that the resulting sieving surface of the endless guide belt substantially covers over the cross-section of the liquid current with no gaps.

33. Sieving device according to claim 29, wherein the guide device or the outer wall is chamfered on the clean water side.

34. Sieving device according to claim 29, wherein the guide device has a grooved design and the guidable sieving panels are equipped with exterior guide rollers on their sides facing the guide device.

35. Sieving device according to claim 29, wherein the laterally arranged guide device is along the outer wall adjacent to the liquid current.

36. Sieving device according to claim 1, further comprising a number of spray jets to spray off the sieving panels of the endless sieve belt which are lifted from the liquid current, as well as a debris channel situated on the side of the endless sieve belt which faces the spray jets.

37. Sieving device according to claim 36, wherein the spray jets and the debris channel extend along both the downward-moving portion of the revolving endless sieve belt and the upward-moving portion of the revolving endless sieve belt.

38. Sieving device according to claim 1, wherein the sieving panels are formed by a sectional frame and a sieving element held in place by said frame.

39. Sieving device according to claim 1, wherein the selected mesh size of the sieving panels is between 0.1 mm and 10 mm.

40. Sieving device according to claim 29, wherein the selected mesh size of the sieving panels is between 2 mm and 4 mm.

41. Sieving device according to claim 1, wherein the sieving panels comprise a debris pocket on their rear end with respect to the direction of motion.

42. Sieving device according to claim 1, wherein the sieving panels have a polygonal structure.

43. Sieving device according to claim 1, wherein the configuration of the endless sieve belt is designed for its revolving motion in such a way that the sieving panels each submerge into and are lifted from the liquid stream in a rectilinear motion, whereby they are deflected in a substantially circular motion at a lower reversal device and an upper reversal device.

* * * * *